(12) United States Patent
Chang et al.

(10) Patent No.: US 12,531,258 B2
(45) Date of Patent: Jan. 20, 2026

(54) HOT BOX DEVICE AND OPERATING METHOD THEREOF

(71) Applicant: Industrial Technology Research Institute, Hsinchu (TW)

(72) Inventors: Shing-Cheng Chang, Kaohsiung (TW); Chia-Hsin Lee, Tainan (TW); Cheng-Hao Yang, Tainan (TW); Wen-Sheng Chang, Hsinchu (TW); Chia-Hao Chen, Yuanlin (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 580 days.

(21) Appl. No.: 18/152,560

(22) Filed: Jan. 10, 2023

(65) Prior Publication Data

US 2024/0194917 A1 Jun. 13, 2024

(30) Foreign Application Priority Data

Dec. 8, 2022 (JP) .................................... 111147097

(51) Int. Cl.
*H01M 8/06* (2016.01)
*H01M 8/0612* (2016.01)
*H01M 8/12* (2016.01)

(52) U.S. Cl.
CPC .. *H01M 8/0618* (2013.01); *H01M 2008/1293* (2013.01)

(58) Field of Classification Search
CPC ............. H01M 8/0618; H01M 2008/1293

USPC ........................................................ 429/419
See application file for complete search history.

(56) References Cited

U.S. PATENT DOCUMENTS

| | | |
|---|---|---|
| 9,166,240 B2 | 10/2015 | Weingaertner et al. |
| 9,401,517 B2 | 7/2016 | Weingaertner et al. |
| 9,520,602 B2 | 12/2016 | Venkataraman et al. |
| 11,394,043 B2 | 7/2022 | Vesely et al. |

(Continued)

FOREIGN PATENT DOCUMENTS

| | | |
|---|---|---|
| CN | 114188563 A | 3/2022 |
| CN | 115101781 A | 9/2022 |

(Continued)

OTHER PUBLICATIONS

Hong et al., "An Experimental Investigation into the Performance of a Novel-Integrated Afterburner-Reformer in a 1 kw Solid Oxide Fuel Cell System", International Journal of Green Energy, 2014, pp. 417-423.

(Continued)

*Primary Examiner* — James M Erwin
(74) *Attorney, Agent, or Firm* — Birch, Stewart, Kolasch & Birch, LLP

(57) ABSTRACT

A hot box device and an operating method thereof are provided. The hot box device includes a first shell, a reformer, a burner, and a cathode inlet pipe. The first shell has a first cavity. The reformer is disposed in the first cavity. The burner is disposed in the reformer and has an opening. The cathode inlet pipe is disposed in the first cavity and extends through the first shell. The cathode inlet pipe is in fluid communication with the first cavity, and the opening of the burner is in fluid communication with the first cavity.

20 Claims, 11 Drawing Sheets

(56) References Cited

U.S. PATENT DOCUMENTS

| | | | | |
|---|---|---|---|---|
| 2008/0248349 | A1* | 10/2008 | McElroy | H01M 8/249 |
| | | | | 429/404 |
| 2012/0178003 | A1* | 7/2012 | Venkataraman | H01M 8/04007 |
| | | | | 429/408 |
| 2016/0064748 | A1 | 3/2016 | Venkataraman et al. | |
| 2018/0191007 | A1 | 7/2018 | Perry et al. | |
| 2019/0379071 | A1* | 12/2019 | Mathé | H01M 8/04225 |
| 2020/0168922 | A1* | 5/2020 | Weingaertner | H01M 8/04761 |
| 2021/0384537 | A1* | 12/2021 | Roychoudhury | H01M 8/04014 |
| 2022/0006107 | A1 | 1/2022 | Hong et al. | |
| 2022/0021010 | A1* | 1/2022 | Bang | H01M 8/04291 |
| 2022/0077478 | A1 | 3/2022 | Hong et al. | |

FOREIGN PATENT DOCUMENTS

| | | |
|---|---|---|
| TW | 201431169 A | 8/2014 |
| TW | M590784 U | 2/2020 |

OTHER PUBLICATIONS

Kim et al., "Experimental Analysis for Thermal Performance of Heat Distribution System in hot BoP of 2 kW-class SOFC", Fuel Cells, 2019, vol. 19, No. 4, pp. 354-360.

Koo et al., "Exergetic evaluation of operation results of 5-kW-class SOFC-HCCI engine hybrid power generation system", Applied Energy, 2021, vol. 295, pp. 117037, total 15 pages.

Saarinen et al., "Design, manufacturing, and operation of movable 2×10 KW size rSOC system", Fuel Cells, 2021, vol. 21, pp. 477-487.

Zhang et al., "Comparative study of solid oxide fuel cell combined heat and power system with Multi-Stage Exhaust Chemical Energy Recycling: Modeling, experiment and optimization", Energy Conversion and Management, 2017, vol. 139, pp. 79-88.

Taiwanese Office Action and Search Report for Taiwanese Application No. 111147097, dated Aug. 16, 2023.

* cited by examiner

HOT BOX DEVICE AND OPERATING METHOD THEREOF

CROSS REFERENCE TO RELATED APPLICATIONS

This application claims priority of Taiwan Patent Application No. 111147097, filed on Dec. 8, 2022, the entirety of which is incorporated by reference herein.

BACKGROUND

Technical Field

The technical field relates to a hot box device and an operating method thereof, and, in particular, to a hot box device with improved thermal uniformity and an operating method thereof.

Description of the Related Art

In general, solid oxide fuel cells SOFC) may include solid oxide and ceramic electrolyte. The SOFC can be used in cogeneration (combined heat and power, or CHP) applications, and has superior performance due to its high conversion efficiency, high stability, fuel diversity, and the like.

However, the SOFC need to be operated at a relatively high operating temperature. Therefore, the SOFC is currently integrated with a hot box device to improve the power generation efficiency of the SOFC. However, the hot box is bulky and suffers from high heat loss, poor thermal uniformity, and poor compatibility with solid oxide fuel cells.

Thus, while existing hot box devices and operating methods have progressively met their intended purposes, they have not been completely satisfactory in all respects. Accordingly, there are still some problems needed to be overcome with respect to hot box devices and operating methods thereof.

SUMMARY

An embodiment of the present disclosure provides a hot box device including a first shell, a reformer, a burner, and a cathode inlet pipe. The first shell has a first cavity. The reformer is disposed in the first cavity. The burner is disposed in the reformer and has an opening. The cathode inlet pipe is disposed in the first cavity and extends through the first shell. The cathode inlet pipe is in fluid communication with the first cavity, and the opening of the burner is in fluid communication with the first cavity.

An embodiment of the present disclosure provides an operating method of a hot box device including providing a first shell having a first cavity. A reformer is disposed in the first cavity. A burner is disposed in the reformer, wherein the burner has an opening which is in fluid communication with the first cavity. A cathode inlet pipe is disposed in the first cavity, so that the cathode inlet pipe extends through the first shell and is in fluid communication with the first cavity. A cathode flue gas is transmitted into the first cavity through the cathode inlet pipe, so that the cathode flue gas fills the first cavity. The cathode flue gas is transmitted from the first cavity into the burner through the opening of the burner.

BRIEF DESCRIPTION OF THE DRAWINGS

Through the following detailed description and the accompanying drawings, a person of ordinary skill in the art will better understand the viewpoints of some embodiments of the present disclosure. It should be noted that, in accordance with standard practice in the industry, various features are not drawn to scale. In fact, the dimensions of the various features may be arbitrarily increased or reduced for clarity of discussion.

DETAILED DESCRIPTION

Figure 1:
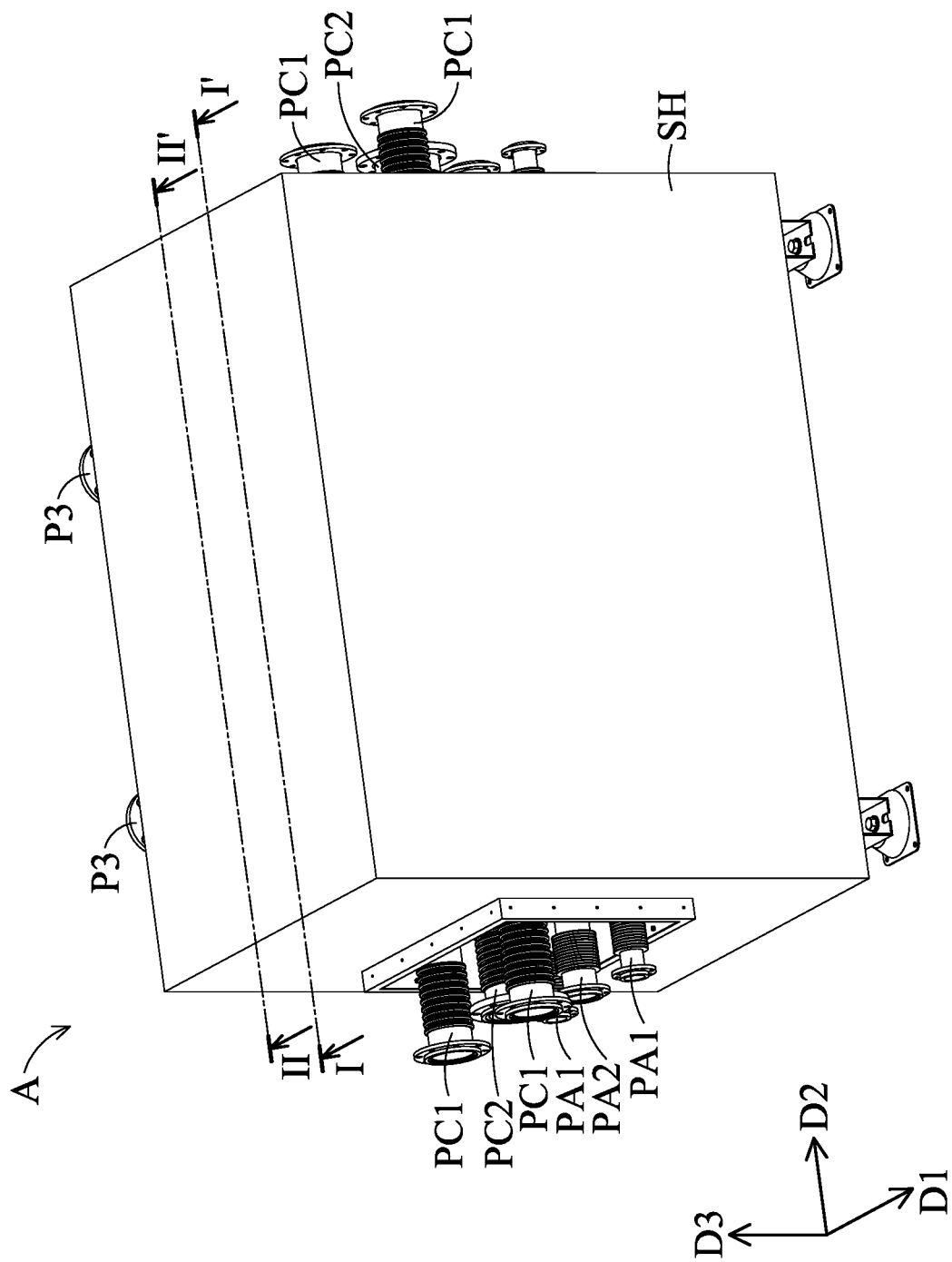
FIG. 1 is a schematic perspective view showing the outer appearance of a hot box device according to some embodiments of the present disclosure.

The design of the present disclosure omits the physical pipe connecting the cathode inlet pipe into the burner and arranges the cathode inlet pipe in fluid communication with the first cavity, and arranges the opening of the burner in fluid communication with the first cavity. Therefore, the present disclosure enables the cathode flue gas (i.e., the exhaust gas) to fill the first cavity, thereby forming an open environment (i.e., in the open air) in the hot box device. Thus, the thermal uniformity of the hot box device is improved, and the heat loss is reduced by using the cathode flue gas. Moreover, since the present disclosure has a first shell, a second shell, and a second cavity interposed therebetween, the heat loss from the hot box device may be reduced.

The hot box device and the operating method thereof of the present disclosure may improve the thermal uniformity, reduce the heat loss, and/or reduce the volume. In order to make some embodiments of the present disclosure more understandable, some embodiments of the present disclosure are listed below in conjunction with the accompanying drawings and are described in detail as follows.

The hot box device and the operating method thereof of various embodiments of the present disclosure will be described in detail below. It should be understood that the following description provides many different embodiments for implementing some embodiments of the present disclosure. The specific elements and arrangements described below are merely to clearly describe some embodiments of the present disclosure. Of course, these are only used as examples rather than limitations of the present disclosure. Furthermore, similar and/or corresponding reference numerals may be used in different embodiments to designate similar and/or corresponding elements in order to clearly describe the present disclosure. However, the use of these similar and/or corresponding reference numerals is only for the purpose of simplification and clear description of some embodiments of the present disclosure and does not imply any correlation between the different embodiments and/or structures discussed.

It should be understood that relative terms, such as "lower", "bottom", "higher" or "top" may be used in various embodiments to describe the relative relationship of one element of the drawings to another element. It will be understood that if the device in the figures were turned upside down, elements described on the "lower" side would become elements on the "upper" side. The embodiments of the present disclosure can be understood together with the drawings, and the drawings of the present disclosure are also regarded as a portion of the disclosure.

Furthermore, when it is mentioned that a first material layer is located on or over a second material layer, it may include the embodiment which the first material layer and the second material layer are in direct contact and the embodiment which the first material layer and the second material layer are not in direct contact with each other, that is one or more layers of other materials is between the first material layer and the second material layer. However, if the first material layer is disposed directly on the second material layer, it means that the first material layer and the second material layer are in direct contact.

In addition, it should be understood that ordinal numbers such as "first", "second" and the like used in the description and claims are used to modify elements and are not intended to imply and represent the element(s) have any previous ordinal numbers, and do not represent the order of a certain element and another element, or the order of the manufacturing method, and the use of these ordinal numbers is only used to clearly distinguished an element with a certain name and another element with the same name. The claims and the specification may not use the same terms, for example, a first element in the specification may be a second element in the claim.

In some embodiments of the present disclosure, terms related to bonding and connection, such as "connecting", "interconnecting", "bonding" and the like, unless otherwise defined, may refer to two structures in direct contact, or they may refer to two structures that are not in direct contact, there being another structure disposed between the two structures. Terms related to bonding and connection can also include embodiments in which both structures are movable, or both structures are fixed.

In the following description and claims, terms such as "including", "comprising" and "having" are open-ended words, so they should be interpreted as meaning "including but not limited to . . . ". Therefore, when the terms "including", "comprising" and/or "having" is used in the description of the present disclosure, it designates the presence of corresponding features, regions, steps, operations and/or elements, but does not exclude the presence of one or more corresponding features, regions, steps, operations and/or elements.

Unless otherwise defined, all terms (including technical and scientific terms) used herein have the same meaning as commonly understood by a person of ordinary skills in the art. It is understood that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

Herein, the respective directions are not limited to three axes of the rectangular coordinate system, such as the X-axis, the Y-axis, and the Z-axis, and may be interpreted in a broader sense. For example, the X-axis, the Y-axis, and the Z-axis may be perpendicular to each other, or may represent different directions that are not perpendicular to each other, but the present disclosure is not limited thereto. For convenience of description, hereinafter, the X-axis direction is the first direction D1 (length direction), the Y-axis direction is the second direction D2 (width direction), and the Z-axis direction is the third direction D3 (height direction). In some embodiments, the schematic cross-sectional views described herein are schematic views of the YZ plane.

In some embodiments, the battery may include a solid oxide fuel cell (SOFC), but the present disclosure is not limited thereto. For example, the battery may include other suitable batteries.

Referring to FIG. 1, it is a schematic perspective view showing the outer appearance of a hot box device A, according to some embodiments of the present disclosure. In some embodiments, as shown in FIG. 1, the hot box device may include a shell SH, pipes (pipeline) disposed on the shell SH, and components disposed in the shell SH. In some embodiments, as shown in FIG. 1, the pipes of the hot box device A may include an anode inlet pipe PA1, an anode outlet pipe PA2, a cathode inlet pipe PC1, a cathode outlet pipe PC2, and/or an outlet pipe (gas outlet pipe) P3. In some embodiments, the anode inlet pipe PA1, the anode outlet pipe PA2, the cathode inlet pipe PC1, the cathode outlet pipe PC2, and/or the outlet pipe P3 may extend through (pass through) the shell SH to be physically connected to external devices.

Figure 10:
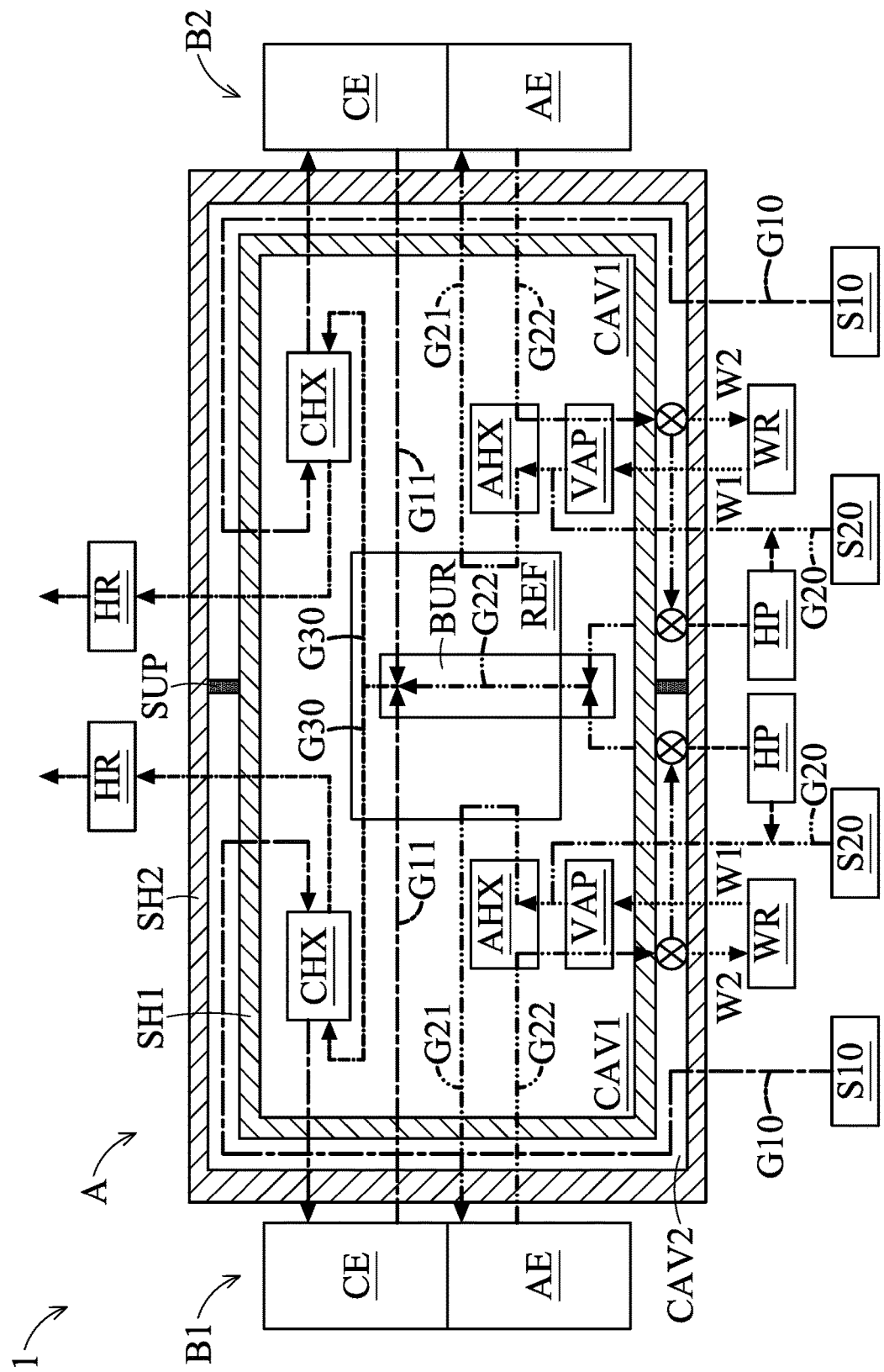
FIG. 10 is a schematic diagram showing an integrated system including a hot box device according to some embodiments of the present disclosure.

In some embodiments, the anode inlet pipe PA1 and the anode outlet pipe PA2 may be connected to the anode of the battery, and the cathode inlet pipe PC1 and the cathode outlet pipe PC2 may be connected to the cathode of the battery. For example, the anode inlet pipe PA1 and the anode outlet pipe PA2 may be physically connected with the anodes AE of the first battery B1 and the second battery B2 as shown in the following FIG. 10, and the cathode inlet pipe PC1 and the cathode outlet pipe PC2 may be physically connected to the cathodes CE of the first battery B1 and the second battery B2 as shown in FIG. 10. In some embodiments, the outlet pipe P3 may be physically connected to the heat recovery unit HR as shown in FIG. 10.

It should be noted that, in the present disclosure, the hot box device A connecting with two batteries is taken as an example for description and illustration. Therefore, FIG. 1 shows two sets of anode inlet pipe PA1, anode outlet pipe PA2, cathode inlet pipe PC1, cathode outlet pipe PC2, and outlet pipe P3 respectively used to connect the two batteries, but the present disclosure is not limited thereto. In some embodiments, the hot box device A may be connected to N batteries. For example, N may be any positive integer such as 1, 2, 3, 4, 5, 10. Therefore, the hot box device A may have N sets of pipes corresponding to N batteries, and each set of pipes may include an anode inlet pipe PA1, an anode outlet pipe PA2, a cathode inlet pipe PC1, a cathode outlet pipe PC2, and an outlet pipe P3.

Figure 2:
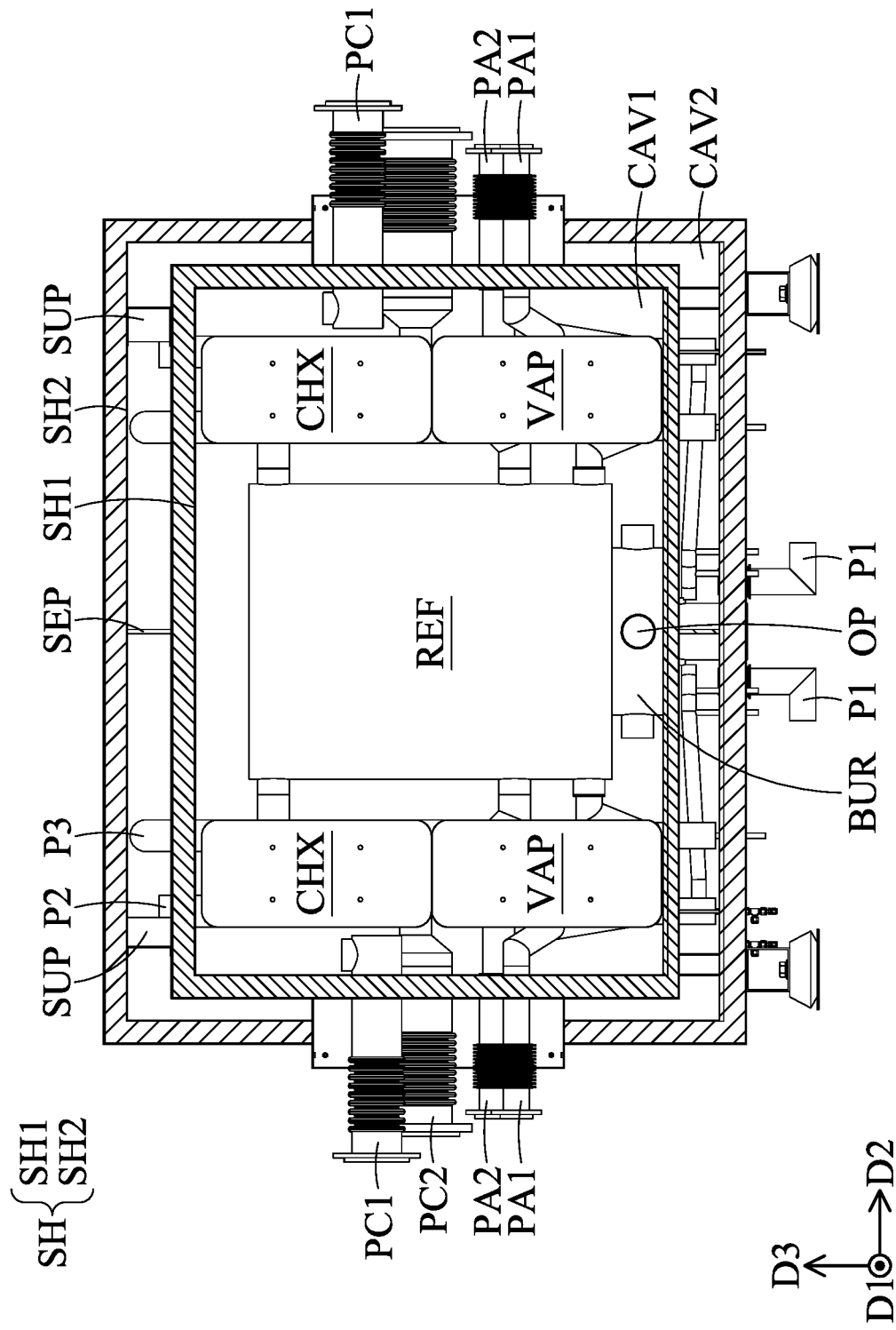
FIG. 2 is a schematic cross-sectional view showing a hot box device according to some embodiments of the present disclosure.
Figure 3:
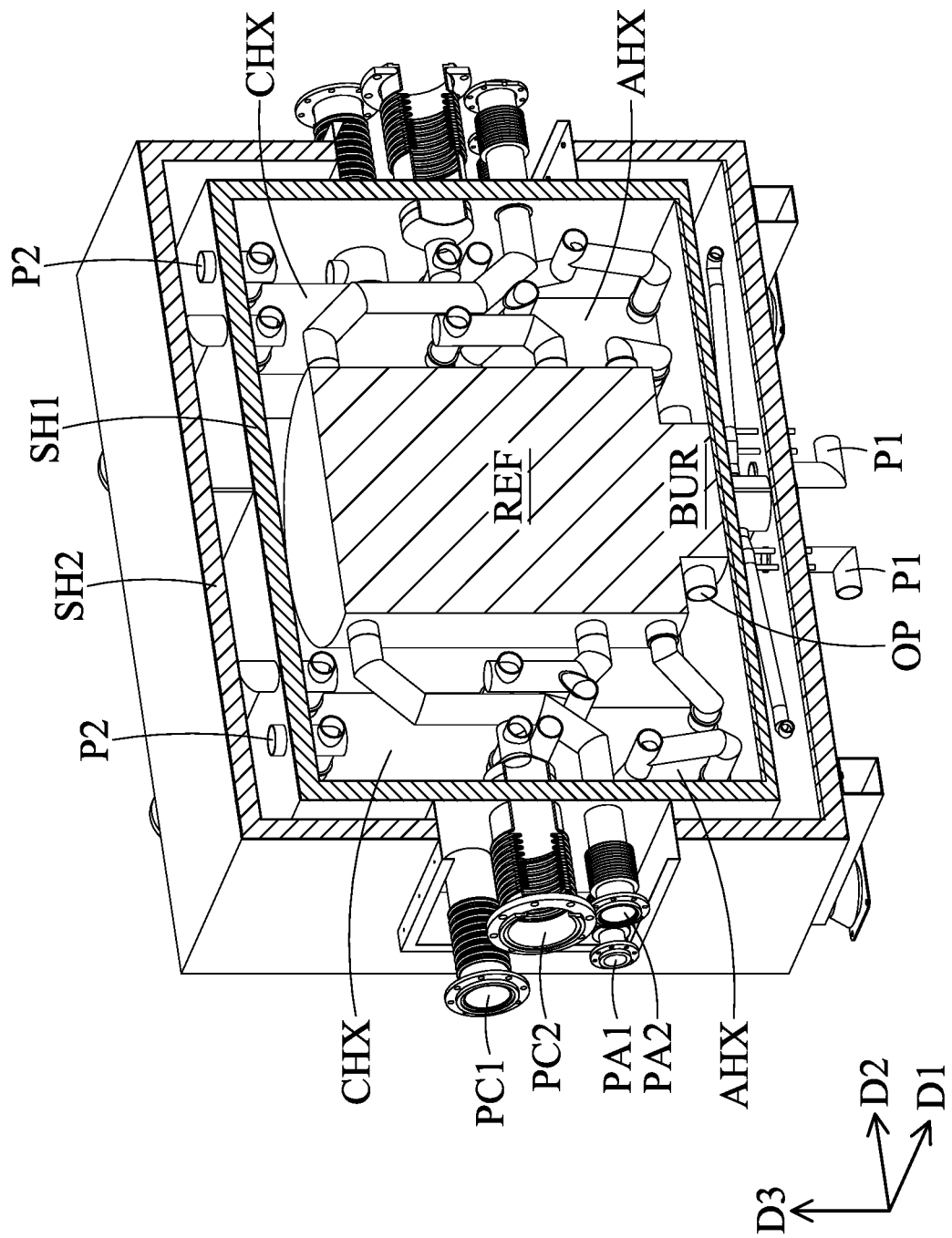
FIG. 3 is a schematic perspective view showing a hot box device according to some embodiments of the present disclosure.

Referring to FIG. 2 and FIG. 3, they are a schematic cross-sectional view taken along the line I-I' in FIG. 1 showing the hot box device A, and a schematic perspective view along the line II-II' in FIG. 1 showing the hot box device A respectively, according to some embodiments of the present disclosure.

In some embodiments, as shown in FIG. 2 and FIG. 3, the shell SH of the hot box device A may include a first shell SH1 and a second shell SH2. In some embodiments, the first shell SH1 may have a first cavity CAV1, and the second shell SH2 may have a second cavity CAV2 between the first shell SH1 and the second shell SH2. In other words, the first cavity CAV1 may be an accommodating space formed in the first shell SH1, and the second cavity CAV2 may be an accommodating space formed between the first shell SH1 and the second shell SH2. In some embodiments, the second shell SH2 may cover the first shell SH1 such that the first shell SH1 is located in the second shell SH2.

In some embodiments, a supporting piece SUP may be disposed between the first shell SH1 and the second shell SH2, so as to physically connect the first shell SH1 and the second shell SH2 by the supporting piece SUP. In some embodiments, a separator SEP may be disposed between the first shell SH1 and the second shell SH2 to define second distinct cavities CAV2 for different batteries. In other embodiments, the separator SEP may be omitted.

In some embodiments, the first shell SH1, the second shell SH2, or a combination thereof may include a thermal insulating material. For example, the thermal insulating material may include oxides such as silicon oxide ($SiO_2$), aluminum oxide ($Al_2O_3$), zirconium oxide ($ZrO_2$), nitrides such as silicon nitride ($Si_3N_4$), ceramic materials, the like, other suitable thermal insulating materials, or a combination thereof, but the present disclosure is not limited thereto. In some embodiments, one of the first shell SH1 and the second shell SH2 may include a metal material, and any one of the first shell SH1 and the second shell SH2 may include the thermal insulating material. In other embodiments, both the first shell SH1 and the second shell SH2 may include thermal insulating materials. Accordingly, the heat loss, volume, and/or cost of the hot box device A may be reduced by using the thermal insulating material.

In some embodiments, the second cavity CAV2 may be an air gap, so the second cavity CAV2 may reduce the thermal energy dissipated from the first shell SH1 toward the second shell SH2. For example, since the outer surface of the second shell SH2 may be in contact with the external environment, a temperature gradient will be generated, thereby dissipating the thermal energy of the hot box device A. Nevertheless, the problem can be overcome with the second cavity CAV2, which may reduce the heat loss of the hot box device A. In some embodiments, the second cavity CAV2 may be filled with air, an inert gas such as nitrogen ($N_2$), or other suitable gas. For example, the heat loss flux lost from the surface of the second shell SH2 may be reduced at least 82%, and even be reduced by 92% by disposing the first shell SH1, the second shell SH2, and the second cavity CAV2. For example, the thickness of the first shell SH1 and the second shell SH2 and/or the total volume of the shell SH may be reduced at least 80%, and even be reduced by 83% by disposing the second cavity CAV2, in order to reduce the volume and cost of the hot box device. In some embodiments, the first shell SH1, the second cavity CAV2, and the second shell SH2 may serve as a multilayer insulation structure.

Figure 4:
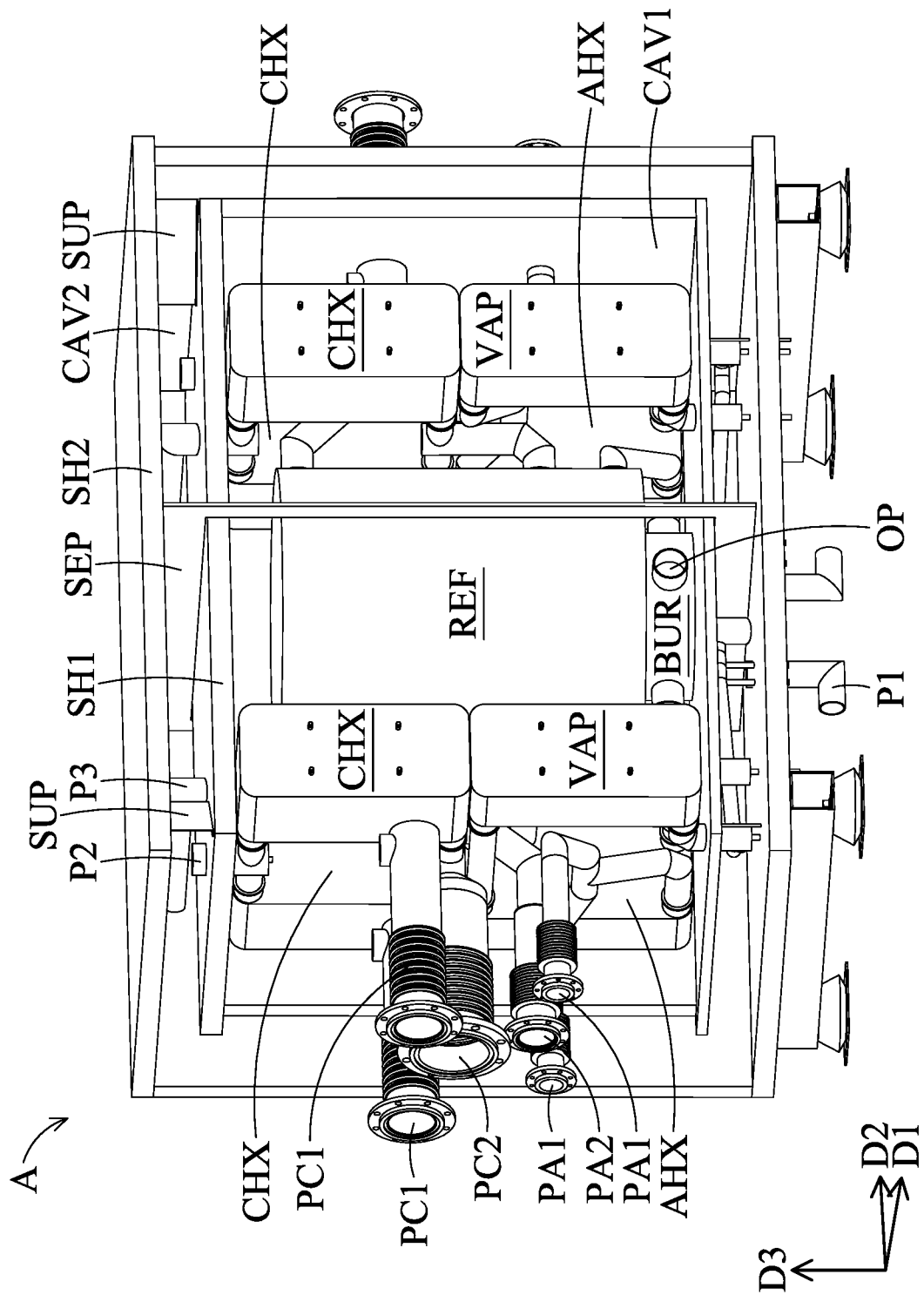
FIG. 4 is a schematic perspective view showing a hot box device according to some embodiments of the present disclosure.

Referring to FIG. 4, it is a schematic perspective view showing the hot box device A according to some embodiments of the present disclosure. For the convenience of illustration, in FIG. 4, some components in the hot box device A are omitted, so as to clearly observe the components in the hot box device A. For example, a portion of the first shell SH1 and a portion of the second shell SH2 are omitted.

As shown in FIG. 4, in some embodiments, the hot box device A may further include a reformer REF, a burner BUR, an anode heat exchanger AHX, a cathode heat exchanger CHX, and an evaporator VAP. Wherein, the reformer REF is a reactor for performing a reforming reaction. For example, the reformer REF executes the fuel reforming reaction to form a hydrogen-rich reformed gas. Wherein, the burner BUR is a reactor for performing a combustion reaction. For example, the burner BUR may include a start burner (not shown) and an exhaust burner (not shown). The exhaust burner may be used to burn the cathode flue gas and the anode flue gas. Wherein, the anode heat exchanger AHX and the cathode heat exchanger CHX are components for performing heat exchange and may be respectively connected with the anode and the cathode of the battery. Wherein, the evaporator VAP is used to perform the vaporization reaction. For example, the evaporator VAP allows water to be heated to water vapor.

In some embodiments, the reformer REF may be disposed on the burner BUR. In some embodiments, the reformer REF may be disposed around the burner BUR. In some embodiments, the burner BUR may be disposed in the reformer REF. Thus, the reformer REF and the burner BUR may be integrated, thereby reducing the volume of the hot box device A. In some embodiments, the reformer REF may be disposed in the first cavity CAV1. In some embodiments, the burner BUR may be disposed in the first cavity CAV1. In some embodiments, the burner BUR may have an opening OP at the bottom of the burner BUR. In some embodiments, the opening OP of the burner BUR may be in fluid communication with the first cavity CAV1. In some embodiments, the burner BUR may have a plurality of openings OP according to demands, so as to facilitate gas mixing and to control the combustion reaction in the burner BUR.

In some embodiments, the anode heat exchanger AHX, the cathode heat exchanger CHX, and/or the evaporator VAP may be disposed adjacent to the reformer REF. In some embodiments, the cathode heat exchanger CHX may be disposed on the evaporator VAP and the anode heat exchanger AHX. In some embodiments, the cathode heat exchanger CHX may be adjacent to the top of the reformer REF, and the evaporator VAP and the anode heat exchanger AHX may be adjacent to the bottom of the reformer REF. In some embodiments, along the first direction D1, the anode heat exchanger AHX and the evaporator VAP are disposed in sequence. It should be noted that the anode heat exchanger AHX, the cathode heat exchanger CHX, and/or the evaporator VAP shown in FIG. 4 are merely examples, but the present disclosure is not limited thereto. In other embodiments, along the first direction D1, the evaporator VAP and the anode heat exchanger AHX are disposed in sequence. In other words, the locations of the anode heat exchanger AHX and the evaporator VAP may exchange.

In some embodiments, the anode heat exchanger AHX may be disposed in the first cavity CAV1. In some embodiments, the anode inlet pipe PA1 may be disposed in the first cavity CAV1 and extends through the first shell SH1 and the second shell SH2. In some embodiments, the anode inlet pipe PA1 may be connected with the anode heat exchanger AHX and the burner BUR. In some embodiments, the anode outlet pipe PA2 may be disposed in the first cavity CAV1 and extends through the first shell SH1 and the second shell SH2. In some embodiments, the anode outlet pipe PA2 may be connected with the anode heat exchanger AHX and the reformer REF.

In some embodiments, the cathode heat exchanger CHX may be disposed in the first cavity CAV1. In some embodiments, the cathode inlet pipe PC1 may be disposed in the first cavity CAV1 and extends through the first shell SH1 and the second shell SH2. In some embodiments, the cathode inlet pipe PC1 is in fluid communication with the first cavity CAV1. In some embodiments, the cathode outlet pipe PC2 may be disposed in the first cavity CAV1. In some embodiments, the cathode outlet pipe PC2 may extend through the first shell SH1 and the second shell SH2. In some embodiments, the cathode outlet pipe PC2 may be connected to the cathode heat exchanger CHX.

In some embodiments, since the opening OP of the burner BUR is in fluid communication with the first cavity CAV1, and the cathode inlet pipe PC1 is in fluid communication with the first cavity CAV1, the cathode inlet pipe PC1 may be used to transmit (transport, transfer, deliver) the gas such as the cathode flue gas. Thus, the cathode flue gas may fill the first cavity CAV1, so that the cathode flue gas is transmitted into the burner BUR through (via) the opening OP of the burner BUR.

In some embodiments, the hot box device A may further include a first inlet pipe (gas inlet pipe) P1 and a second inlet pipe P2. In some embodiments, the first inlet pipe P1 may extend through the second shell SH2 and be in fluid communication with the second cavity CAV2. In some embodiments, the second inlet pipe P2 may extend through the first shell SH1 and be in fluid communication with the second cavity CAV2. The second inlet pipe P2 may be connected with the cathode heat exchanger CHX.

Referring to FIG. 5 to FIG. 9, which shows the schematic perspective views of the hot box device A according to some embodiments of the present disclosure, respectively. Further, FIG. 5 to FIG. 9 show the fluid transmission path of the hot box device A. For example, fluid includes liquid, gas, and a combination thereof. For ease of illustration, in FIG. 5 to FIG. 9, some components in the hot box device A are omitted, to clearly observe the components and fluid transmission paths in the hot box device. For example, the first shell SH1 and the second shell SH2 of the hot box device A are omitted. FIG. 5 to FIG. 9, FIG. 10, and FIG. 11 show the fluid transmission paths, wherein the arrows represent the transmission direction of the fluid, and different dotted lines represent different fluids.

Simultaneously referring to FIG. 10, which shows a schematic diagram of an integrated system 1, including the hot box device A according to some embodiments of the present disclosure. As shown in FIG. 10, in some embodiments, the integrated system 1 includes a hot box device A, and one or more batteries (for example, a first battery B1 and a second battery B2). In some embodiments, the hot box device A may be connected to the aforementioned N batteries, and the pipes and fluid transmission paths between the hot box device A and each of the N batteries may be the same or different.

In the following, the fluid transmission path between the hot box device A and the first battery B1 is taken as an example for illustration, but the present disclosure is not limited thereto. In this embodiment, the fluid transmission path between the hot box device A and the second battery B2 is the same as the fluid transmission path between the hot box device A and the first battery B1.

In some embodiments, in the present disclosure, the terms "the cathode flue gas" and "the anode flue gas" represent the gases generated at the cathode and anode, respectively, after the battery undergoes an electrochemical exothermic reaction. In some embodiments, since the cathode CE of the first battery B1 is fed with a first gas G10, and the anode AE of the first battery B1 is fed with a reformed gas G21, the electrochemical exothermic reaction may occur in the first battery B1. Therefore, the first battery B1 may provide electric energy, the cathode flue gas G11 may be provided at the cathode CE of the first battery B1, and the high-heat anode flue gas G22 may be provided at the anode AE of the first battery B1.

Figure 5:
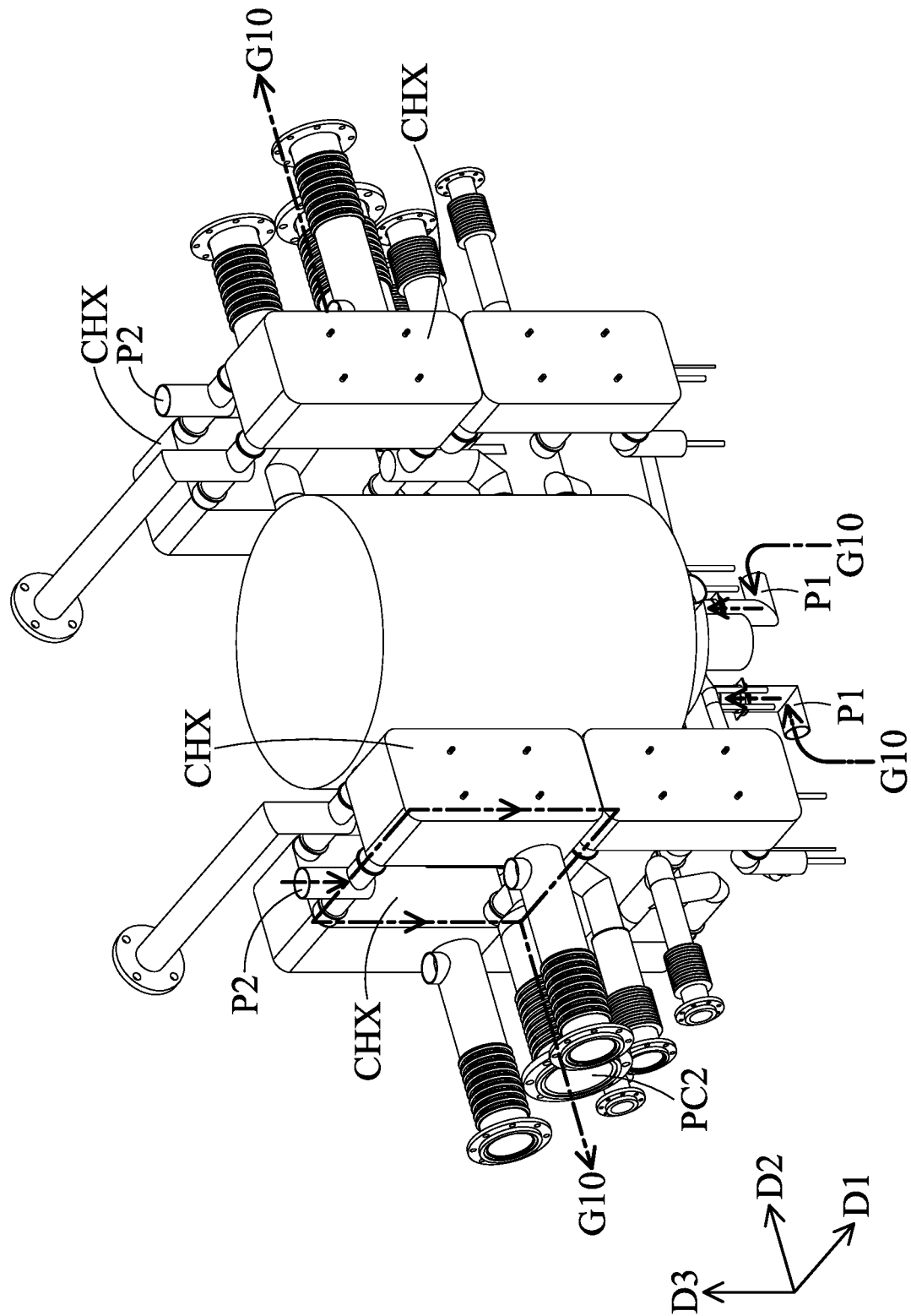
FIG. 5 to FIG. 9 are schematic perspective views showing a hot box device according to some embodiments of the present disclosure.

As shown in FIG. 5 and FIG. 10, the transmission path of the first gas G10 is shown. In some embodiments, the first gas G10 is transmitted from a first gas source S10 into the second cavity CAV2 through the first inlet pipe P1, so that the first gas G10 fills the second cavity CAV2. In some embodiments, the first gas source S10 may be a bottled gas, a pump, the like, or a combination thereof, or the first inlet pipe P1 may be directly connected to the external environment (for example, atmospheric environment). In some embodiments, the first gas G10 may include a comburent. For example, the first gas G10 may include air, the similar substances, or a combination thereof, but the present disclosure is not limited thereto. In some embodiments, the first gas G10 is transmitted from the second cavity CAV2 to the cathode heat exchanger CHX through the second inlet pipe P2. In some embodiments, the first gas G10 is transmitted to the cathode CE of the first battery B1 through the cathode outlet pipe PC2, so that the first gas G10 undergoes an electrochemical reaction in the first battery B1, and the first gas G10 is reacted to form cathode flue gas G11 at the cathode CE of the first battery B1.

Figure 6:
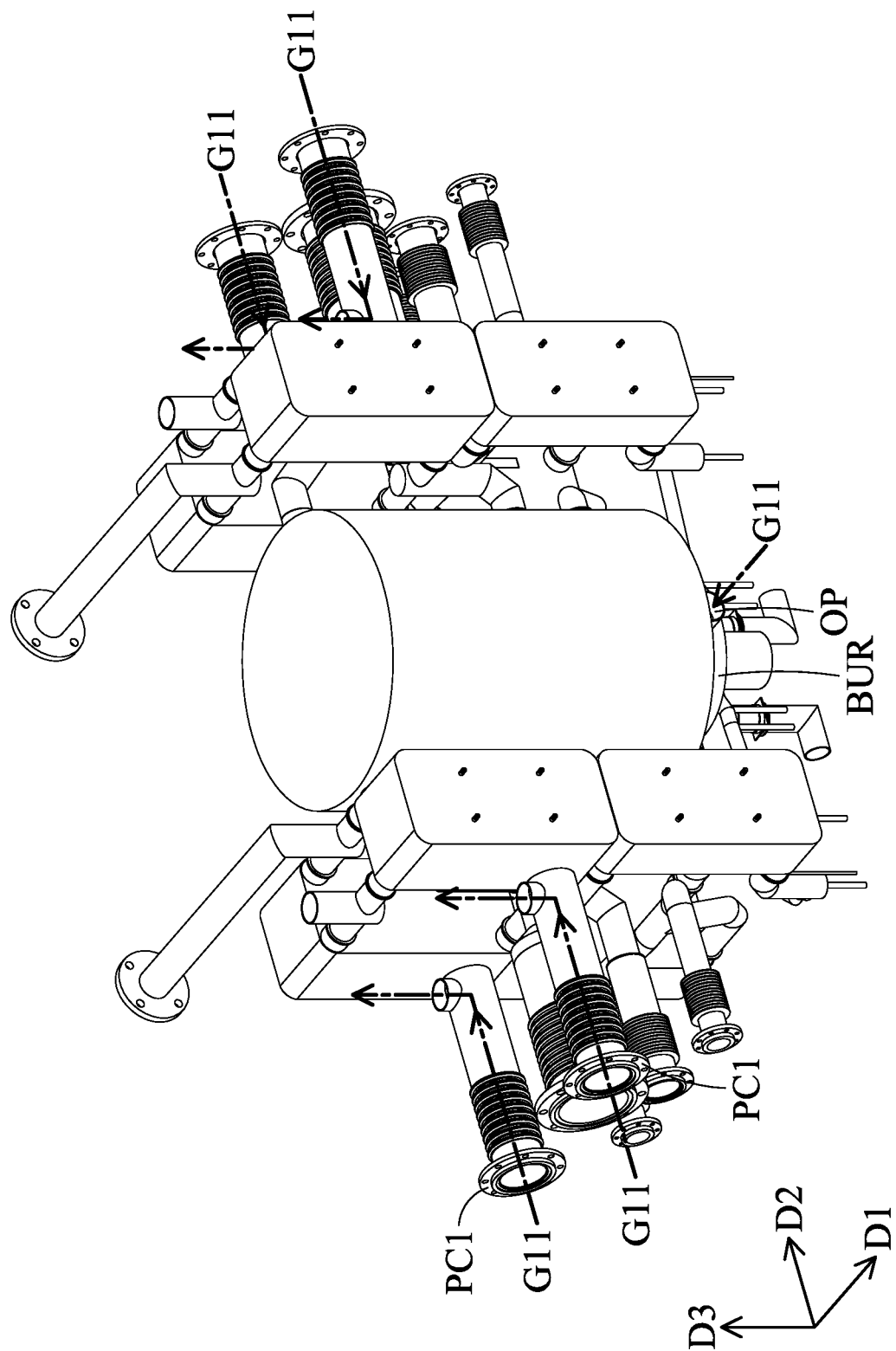

As shown in FIG. 6 and FIG. 10, the transmission path of the cathode flue gas G11 is shown. In some embodiments, the cathode flue gas G11 is transmitted into the first cavity CAV1 through the cathode inlet pipe PC1, so that the cathode flue gas G11 fills the first cavity CAV1. Then, the cathode flue gas G11 is transmitted from the first cavity CAV1 into the burner BUR through the opening OP of the burner BUR. In some embodiments, in the second direction D2, the vertical location of the cathode inlet pipe PC1 is higher than the vertical location of the opening OP of the burner BUR, so that the cathode flue gas G11 may completely fill the first cavity CAV1.

In some embodiments, the cathode flue gas G11 is transmitted into the first cavity CAV1 by diffusion. In other words, the hot box device A of the present disclosure omits the physical pipe for transmitting the cathode flue gas G11 from the cathode CE of the first battery B1 to the burner BUR. In some embodiments, the cathode flue gas G11 may be in direct contact with the inner surface of the first shell SH1. In some embodiments, the cathode flue gas G11 may be in direct contact with the outer surfaces of the reformer REF, the anode heat exchanger AHX, the cathode heat exchanger CHX, and/or the evaporator VAP.

In some embodiments, the first cavity CAV1 may be substantially filled with the cathode flue gas G11. In some embodiments, the cathode flue gas G11 may account for at least 80% of the total volume of gas in the first cavity CAV1. For example, the cathode flue gas G11 may account for 80%, 85%, 90%, 95%, 99%, or other suitable values or value ranges of the total volume of the gas in the first cavity CAV1, but the present disclosure is not limited thereto. In some embodiments, the insulating material disposed on the reformer REF, the anode heat exchanger AHX, the cathode heat exchanger CHX, and/or the evaporator VAP may be omitted. Accordingly, the cathode flue gas G11 may exchange heat with the reformer REF, the anode heat exchanger AHX, the cathode heat exchanger CHX, and/or the evaporator VAP.

In some embodiments, the first cavity CAV1 in the first shell SH1 may be regarded as an open environment (in the open air). In some embodiments, as shown in FIG. 6 and FIG. 10, the cathode flue gas G11 provided from the cathode CE of the first battery B1 and the cathode flue gas G11 provided from the cathode CE of the second battery B2 may be mixed in the first cavity CAV1. After the cathode flue gases G11 from different batteries are mixed, it may be fed to the burner BUR for combustion. Accordingly, since the first cavity CAV1 is the open environment, the problem of different temperatures of the cathode flue gas G11 from various sources due to the different efficiencies of the batteries may be reduced. Furthermore, the thermal uniformity in the first cavity CAV1 and the burner BUR may be improved. For example, the chance of drastic temperature changes in hot box device A and/or the maximum difference in temperature changes in hot box device A may be reduced. Therefore, the first cavity CAV1 serving as the open environment may reduce thermal shock, thereby providing a hot box device A with improved reliability. Accordingly, the hot box device A of the present disclosure may be applied to provide base-load current. In some embodiments, since the first cavity CAV1 provides a high heat environment, the temperature required by the burner BUR may be lowered to facilitate the combustion reaction. In some embodiments, the first cavity CAV1 serving as the open environment may improve the temperature uniformity of the gas input into and/or output from the hot box device A.

Figure 7:
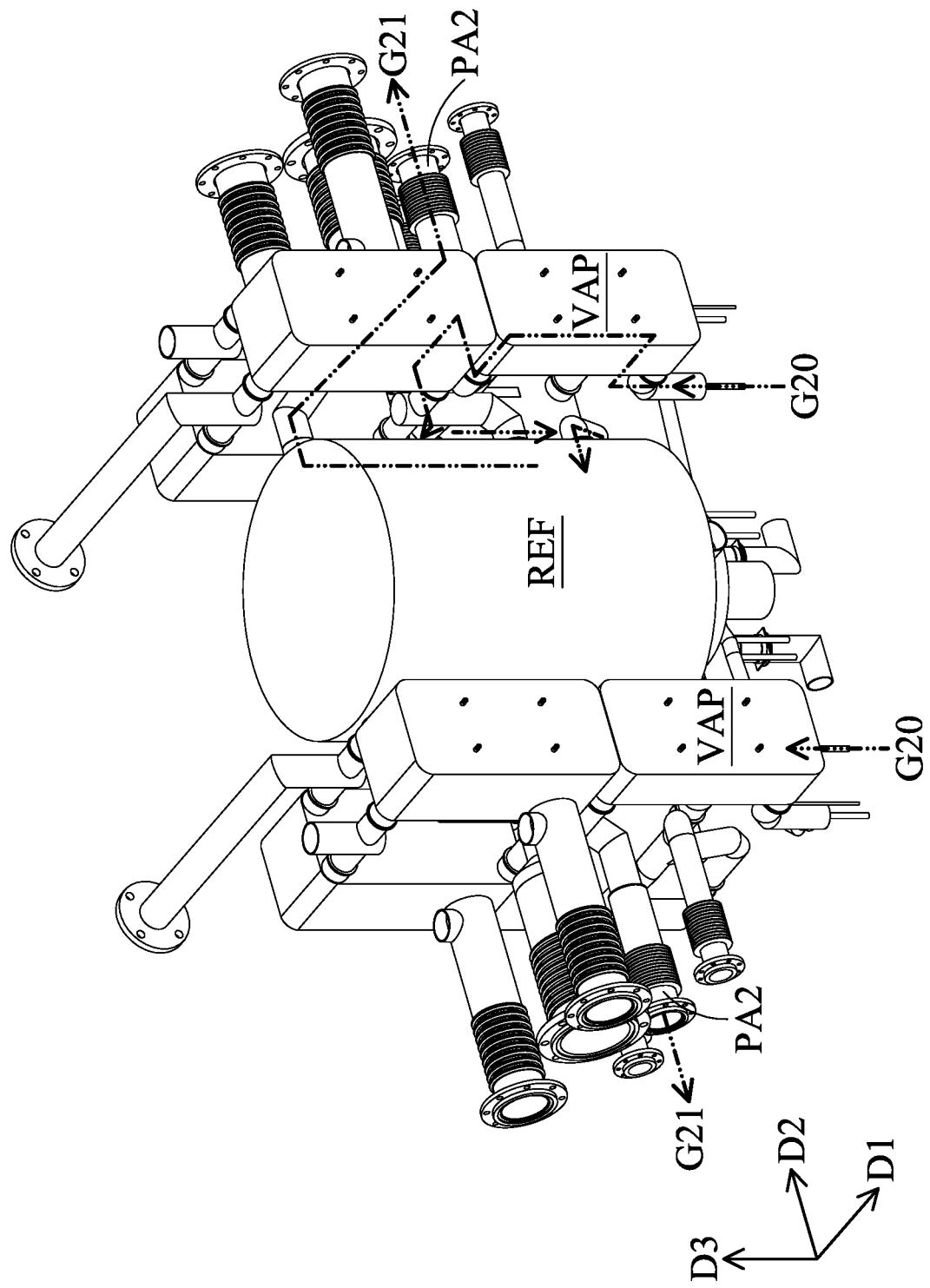

As shown in FIG. 7 and FIG. 10, the transmission path of the second gas G20 is shown. In some embodiments, the second gas G20 is transmitted from the second gas source S20 to the reformer REF, so that the second gas G20 is reacted to form a reformed gas G21. In some embodiments, the second gas source S20 may be a bottled gas, a pump, the like, or a combination thereof. In some embodiments, the second gas G20 may include fuel. For example, the second gas G20 may be natural gas, liquefied petroleum gas, $C_1$-$C_{10}$ lower alkanes (such as methane, ethane, propane), $C_1$-$C_{10}$ lower alcohols (such as methanol, ethanol, propanol), gasoline, diesel, biofuel, biogas, industrial residual hydrogen, the similar substances, or a combination thereof, but the present disclosure is not limited thereto. In some other embodiments, the second gas G20 may include an inert gas, such as nitrogen, so that the combustion reaction may be slowed down or stopped by inputting the inert gas. Therefore, the turn-on/turn-off of the hot box device A may be controlled by adjusting the type of the second gas G20.

In some embodiments, one burner BUR may correspond to the aforementioned N batteries. For example, N batteries may share one burner BUR, so that the cathode flue gases G11 and anode flue gases G22 from different batteries are burned in the same burner BUR. In other words, by sharing the burner BUR, the combustion controllability of the burner BUR may be improved, and the volume of the hot box device A and that of the integrated system 1 may be reduced. In detail, the common burner BUR may reduce the differences in parameters such as the composition and the temperature of the cathode flue gases G11 and the anode flue gases G22 from different batteries, thereby improving the compatibility of the hot box device A with batteries with different power generation performances. In some embodiments, one reformer REF may correspond to the aforementioned N batteries. For example, N batteries may share one reformer REF. In other words, by sharing the reformer REF, the volume of the hot box device A may be reduced, and the volume of the integrated system 1 may also be reduced.

In some embodiments, the second gas G20 may be converted into a hydrogen-rich reformed gas through a steam reforming reaction, so as to increase the proportion of hydrogen in the reformed gas. In detail, in some embodiments, the water W1 may be transmitted to the evaporator VAP, so that the water W1 is heated into water vapor. Then, the second gas G20 is introduced, so that the second gas G20 is mixed with the water vapor to form a mixed gas G20', and the mixed gas G20' is reacted in the reformer REF to generate a reformed gas G21. Then, in some embodiments, the reformed gas G21 is transmitted to the anode AE of the first battery B1 through the anode outlet pipe PA2, so that the reformed gas G21 is reacted at the anode AE of the first battery B1 to form an anode flue gas G22.

Figure 8:
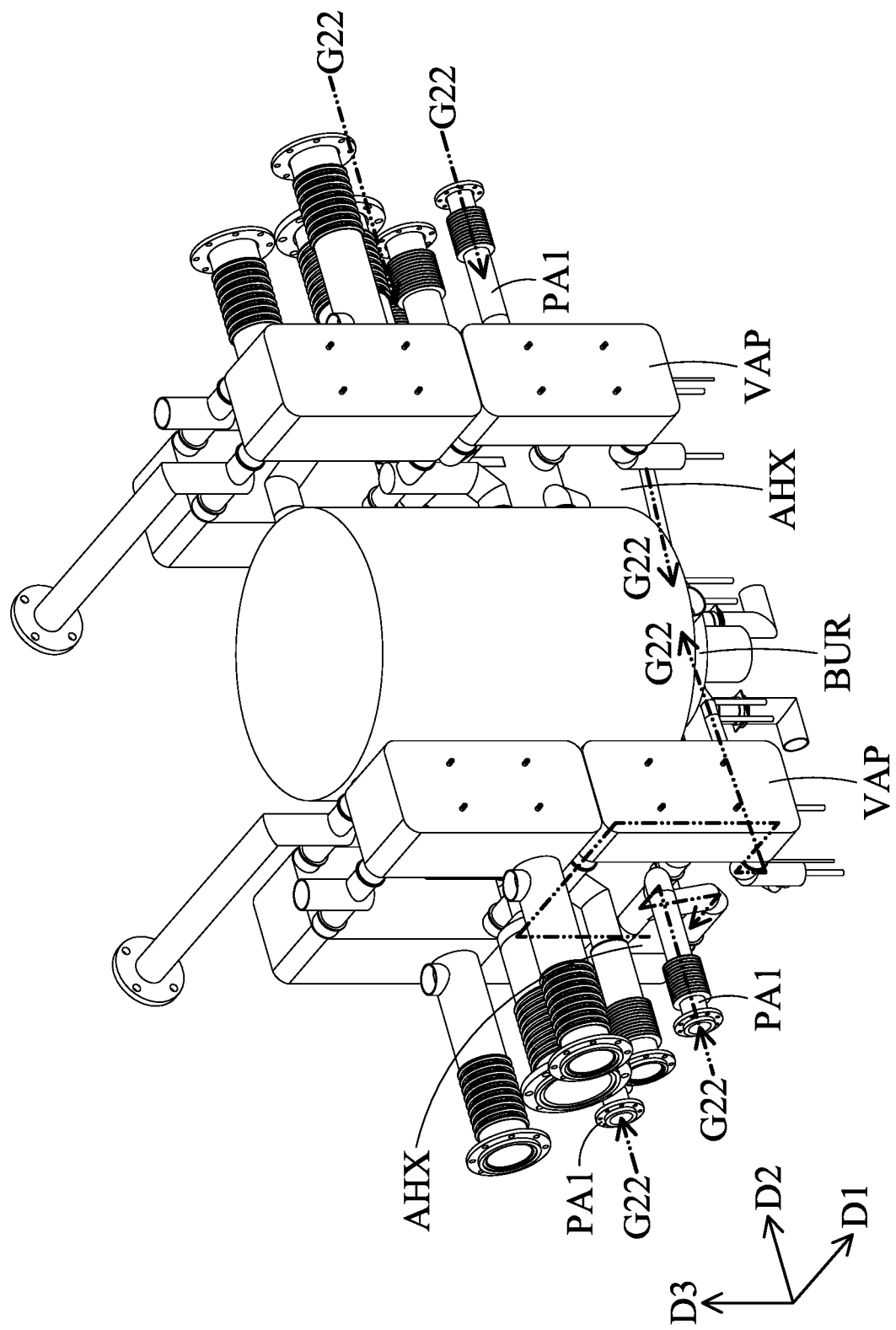

As shown in FIG. 8 and FIG. 10, the transmission path of the anode flue gas G22 is shown. In some embodiments, the anode flue gas G22 is transmitted to the burner BUR through the anode inlet pipe PA1. In some embodiments, in the anode heat exchanger AHX, the mixed gas G20' including the second gas G20 and the water vapor is heated using the anode flue gas G22. In detail, in some embodiments, the anode flue gas G22 is transmitted to the anode heat exchanger AHX, thereby preheating the mixed gas G20' including the second gas G20 and the water vapor. Thus, the heat loss of the hot box device A may be reduced. Next, the anode flue gas G22 is fed to the evaporator VAP, so that the water W2 in the anode flue gas G22 is transmitted to the water circulator WR to facilitate water circulation. For example, the water W2 separated from the anode flue gas G22 may be re-entered into the evaporator VAP, thereby reducing costs. Then, the anode flue gas G22 except for the water W2 may be further transmitted into the burner BUR. Moreover, in some embodiments, a pump HP, such as a hydrogen ($H_2$) pump, may be further disposed to adjust the hydrogen content in the anode flue gas G22. For example, the hydrogen in the anode flue gas G22 may be transmitted to the anode heat exchanger AHX and the reformer REF by the pump HP and transmitted to the first battery B1 as the reactant of the first battery B1.

Figure 9:
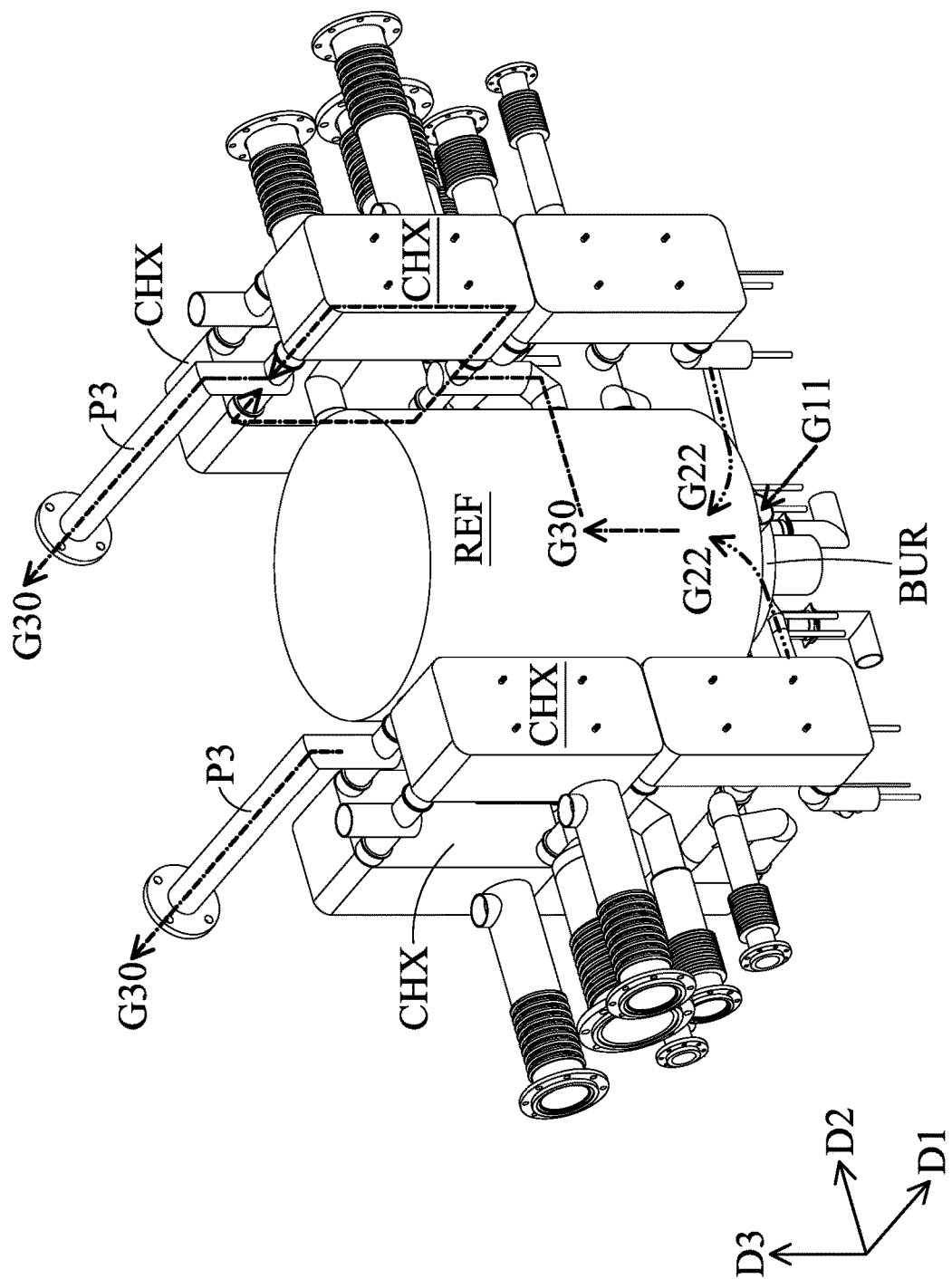

As shown in FIG. 9 and FIG. 10, the transmission path of the third gas G30 is shown. In some embodiments, the cathode flue gas G11 and the anode flue gas G22 are combusted in the burner BUR to generate a third gas G30. In some embodiments, since the third gas G30 has high heat, and the burner BUR is disposed in the reformer REF, the third gas G30 may provide thermal energy to the burner BUR, thereby improving the thermal conversion efficiency of the hot box device A and reducing the heat loss. In some embodiments, the third gas G30 is transmitted to the cathode heat exchanger CHX through the outlet pipe P3, so that the first gas G10 is heated by the third gas G30 to preheat the fed first gas G10, thereby reducing the heat loss of the hot box device A. In some embodiments, the outlet pipe P3 may be a manifold pipe so as to evenly distribute the thermal energy of the third gas G30 to each cathode heat exchanger CHX.

In some embodiments, the third gas G30 may be transmitted to the heat recovery unit HR through the outlet pipe P3, so that the thermal energy of the third gas G30 may be recovered by the heat recovery unit HR. For example, the heat recovery unit HR may be a thermoelectric symbiosis heat exchanger to convert the thermal energy of the third gas G30 into electrical energy. In some embodiments, since the first cavity CAV1 is an open environment, and the combustion exothermic reaction occurs in the burner BUR, the thermal energy in the first cavity CAV1 may be thermally conducted to the second cavity CAV2, thereby heating the first gas G10 in the second cavity CAV2. Accordingly, by disposing the second cavity CAV2, the hot box device A of the present disclosure may reduce heat loss.

Figure 11:
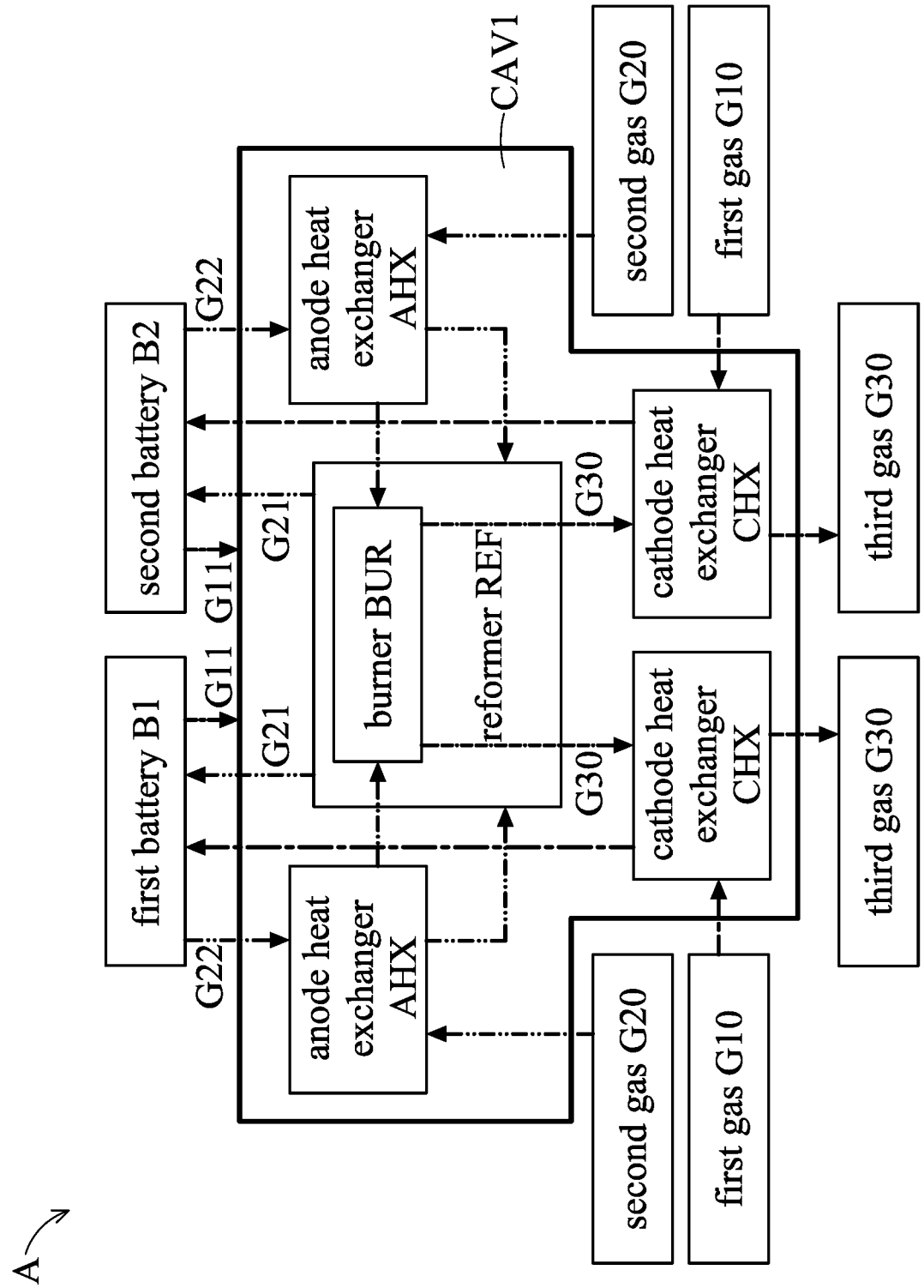
FIG. 11 is a schematic diagram showing a hot box device according to some embodiments of the present disclosure.

FIG. 11 is a schematic diagram showing the hot box device A according to some embodiments of the present disclosure. As shown in FIG. 11, the evaporator VAP is omitted for convenience of description. In some embodiments, the open environment described in the present disclosure is shown by the first cavity CAV1 in FIG. 11. In some embodiments, the first cavity CAV1 may reduce the difference between the power generation performances of the different batteries because the cathode flue gases G11 from the different batteries (for example, the first battery B1 and the second battery B2) may feed into the first cavity CAV1.

In conclusion, in some embodiments, the hot box device includes a cathode inlet pipe extending through the first shell and a burner having an opening. Thus, the cathode inlet pipe is in fluid communication with the first cavity, and the opening of the burner is in fluid communication with the first cavity. Therefore, the cathode flue gas may fill the first cavity, so as to improve the thermal uniformity of the hot box device and reduce heat loss of the hot box device. For example, since the cathode flue gas fills the first cavity, the cathode flue gas may maintain or increase the temperature in the first cavity, thereby facilitating the reactions in the burner of the hot box device and the solid oxide battery connected to the hot box device. For example, cathode flue gases from different batteries may be transmitted to the first cavity and mixed evenly in the first cavity, thereby improving the compatibility of different batteries when connected to the hot box device. In some embodiments, due to the omission of the physical pipe between the cathode inlet pipe to the burner, the volume of the hot box device may be reduced, which facilitates the integration of other devices. In some embodiments, since the hot box device has a second cavity, and the first shell and/or the second shell may include thermal insulating material, heat loss from the hot box device may be reduced.

The features among the various embodiments may be arbitrarily combined as long as they do not violate or conflict with the spirit of the disclosure. In addition, the scope of the present disclosure is not limited to the process, machine, manufacturing, material composition, device, method, and step in the specific embodiments described in the specification. A person of ordinary skill in the art will understand current and future processes, machine, manufacturing, material composition, device, method, and step from the content disclosed in some embodiments of the present disclosure, as long as the current or future processes, machine, manufacturing, material composition, device, method, and step performs substantially the same functions or obtain substantially the same results as the present disclosure. Therefore, the scope of the present disclosure includes the above-mentioned process, machine, manufacturing, material composition, device, method, and steps.

The foregoing outlines features of several embodiments of the present disclosure, so that a person of ordinary skill in the art may better understand the embodiments of the present disclosure. A person of ordinary skill in the art should appreciate that, the present disclosure may be readily used as a basis for designing or modifying other processes and structures. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A hot box device, comprising:
    a first shell having a first cavity;
    a reformer disposed in the first cavity;
    a burner disposed in the reformer and having an opening; and
    a cathode inlet pipe disposed in the first cavity and extending through the first shell,
    wherein the cathode inlet pipe is in fluid communication with the first cavity, and the opening of the burner is in fluid communication with the first 8 cavity.

2. The hot box device as claimed in claim 1, wherein the cathode inlet pipe is used to transmit a cathode flue gas, so that the cathode flue gas fills the first cavity and is transmitted into the burner through the opening of the burner.

3. The hot box device as claimed in claim 1, further comprising:
    a second shell covering the first shell and having a second cavity between the first shell and the second shell.

4. The hot box device as claimed in claim 3, wherein the first shell, the second shell or a combination thereof includes a thermal insulating material.

5. The hot box device as claimed in claim 3, wherein the second cavity is an air gap.

6. The hot box device as claimed in claim 3, further comprising:
    a cathode heat exchanger disposed in the first cavity;
    a first inlet pipe extending through the second shell and in fluid communication with the second cavity;
    a second inlet pipe extending through the first shell and in fluid communication with the second cavity, and connecting with the cathode heat exchanger; and
    a cathode outlet pipe disposed in the first cavity, extending through the first shell and the second shell, and connecting with the cathode heat 9 exchanger.

7. The hot box device as claimed in claim 3, further comprising:
    an anode heat exchanger disposed in the first cavity;
    an anode inlet pipe disposed in the first cavity, extending through the first shell and the second shell, and connecting with the anode heat exchanger and the burner; and
    an anode outlet pipe disposed in the first cavity, extending through the first shell and the second shell, and connecting with the anode heat exchanger and the reformer.

8. The hot box device as claimed in claim 3, wherein the cathode inlet pipe extends through the first shell and the second shell.

9. The hot box device as claimed in claim 3, wherein the cathode inlet pipe is located higher than the opening of the burner.

10. An operating method of a hot box device, comprising:
    providing a first shell having a first cavity;
    disposing a reformer in the first cavity;
    disposing a burner in the reformer, wherein the burner has an opening in fluid communication with the first cavity;
    disposing a cathode inlet pipe in the first cavity, so that the cathode inlet pipe extends through the first shell and is in fluid communication with the first cavity;
    transmitting a cathode flue gas into the first cavity through the cathode inlet pipe, so that the cathode flue gas fills the first cavity; and
    transmitting the cathode flue gas from the first cavity into the burner through the opening of the burner.

11. The operating method as claimed in claim 10, wherein the cathode flue gas is in direct contact with an inner surface of the first shell.

12. The operating method as claimed in claim 10, wherein the cathode flue gas is in direct contact with an outer surface of the reformer.

13. The operating method as claimed in claim 10, wherein the cathode flue gas accounts for at least 80% of a total volume of the first cavity.

14. The operating method as claimed in claim 10, further comprising:
   providing a second shell, wherein the second shell covers the first shell and forms a second cavity between the first shell and the second shell;
   disposing a cathode heat exchanger in the first cavity;
   disposing a first inlet pipe extending through the second shell, so that the first inlet pipe is in fluid communication with the second cavity;
   disposing a second inlet pipe extending through the first shell, so that the second inlet pipe is in fluid communication with the second cavity and is connected with the cathode heat exchanger;
   transmitting a first gas into the second cavity through the first inlet pipe, so that the first gas fills the second cavity; and
   transmitting the first gas from the second cavity into the cathode heat exchanger through the second inlet pipe.

15. The operating method as claimed in claim 14, further comprising:
   disposing a cathode outlet pipe in the first cavity, wherein the cathode outlet pipe extends through the first shell and the second shell and is connected with the cathode heat exchanger;
   transmitting the first gas through the cathode outlet pipe; and
   reacting the first gas to form the cathode flue gas.

16. The operating method as claimed in claim 15, further comprising:
   disposing an anode heat exchanger in the first cavity;
   disposing an anode outlet pipe in the first cavity, wherein the anode outlet pipe extends through the first shell and the second shell and is connected with the anode heat exchanger and the reformer;
   transmitting a second gas into the reformer, so that the second gas is reacted to form a reformed gas;
   transmitting the reformed gas through the anode outlet pipe; and
   reacting the reformed gas to form an anode flue gas.

17. The operating method as claimed in claim 16, wherein the first gas is reacted to form the cathode flue gas by an electrochemical reaction, and the reformed gas is reacted to form the anode flue gas by the electrochemical reaction.

18. The operating method as claimed in claim 16, further comprising:
   disposing an anode inlet pipe in the first cavity, wherein the anode inlet pipe extends through the first shell and the second shell and is connected with the anode heat exchanger and the burner; and
   transmitting the anode flue gas into the burner through the anode inlet pipe.

19. The operating method as claimed in claim 18, further comprising:
   heating the second gas using the anode flue gas in the anode heat exchanger.

20. The operating method as claimed in claim 19, further comprising:
   combusting the cathode flue gas and the anode flue gas in the burner to produce a third gas; and
   transmitting the third gas into the cathode heat exchanger, so that the first gas is heated by the third gas.

* * * * *